(12) United States Patent
Randall

(10) Patent No.: US 8,081,408 B2
(45) Date of Patent: Dec. 20, 2011

(54) PROTECTION OF EXPOSED CONTACTS CONNECTED TO A BRIDGE RECTIFIER AGAINST ELECTROSTATIC DISCHARGE

(75) Inventor: Mitch Randall, Longmont, CO (US)

(73) Assignee: Pure Energy Solutions, Inc., Boulder, CO (US)

( * ) Notice: Subject to any disclaimer, the term of this patent is extended or adjusted under 35 U.S.C. 154(b) by 507 days.

(21) Appl. No.: 12/363,509

(22) Filed: Jan. 30, 2009

(65) Prior Publication Data
US 2009/0190276 A1 Jul. 30, 2009

Related U.S. Application Data

(60) Provisional application No. 61/024,773, filed on Jan. 30, 2008.

(51) Int. Cl.
*H02H 9/00* (2006.01)
(52) U.S. Cl. .......................................................... 361/56
(58) Field of Classification Search ................ 361/56
See application file for complete search history.

(56) References Cited

U.S. PATENT DOCUMENTS

| | | | | |
|---|---|---|---|---|
| 5,631,793 A * | 5/1997 | Ker et al. | .......... | 361/56 |
| 6,587,321 B2 * | 7/2003 | Woo | ............... | 361/56 |
| 6,862,161 B2 * | 3/2005 | Woo | ............... | 361/56 |
| 7,059,182 B1 | 6/2006 | Ragner | | |
| 7,082,019 B2 | 7/2006 | Bodeau et al. | | |
| 7,485,930 B2 * | 2/2009 | Lee et al. | ......... | 257/355 |
| 7,679,878 B2 * | 3/2010 | Maggiolino | ......... | 361/119 |
| 7,787,227 B1 * | 8/2010 | Terrovits | .......... | 361/56 |
| 7,955,941 B2 * | 6/2011 | Etter et al. | ......... | 438/380 |
| 2004/0001293 A1 * | 1/2004 | Woo | ............... | 361/56 |
| 2006/0084861 A1 | 4/2006 | Blank et al. | | |
| 2007/0039929 A1 | 2/2007 | Buhler et al. | | |
| 2009/0190276 A1 * | 7/2009 | Randall | ........... | 361/56 |

OTHER PUBLICATIONS

International Search Report for PCT/US09/32694, ISA/US, May 12, 2009.

\* cited by examiner

*Primary Examiner* — Ronald W Leja
(74) *Attorney, Agent, or Firm* — James R. Young; Cochran Freund & Young LLC

(57) ABSTRACT

Disclosed is a protection circuit for protecting a rectifier circuit from electrostatic pulses. The circuit employs a first bypass capacitor that is connected between positive and negative power lines to bypass electrostatic pulses that have a rise time that allows the diodes to conduct and prevent damage to the diodes as a result of reverse biasing, and a second bypass capacitor that is connected between an input node and the negative power line to discharge the electrostatic pulses that have a rise time that is faster than the turn-on times of the diodes. Connection of the bypass capacitors at locations close to the rectifying diodes minimizes the effects of stray inductance that affects the operation of the rectifier circuit in response to fast rise time transient pulses.

29 Claims, 14 Drawing Sheets

PROTECTION OF EXPOSED CONTACTS CONNECTED TO A BRIDGE RECTIFIER AGAINST ELECTROSTATIC DISCHARGE

CROSS-REFERENCE TO RELATED APPLICATIONS

This application is based upon and claims the benefit of U.S. provisional application Ser. No. 61/024,773, entitled "PROTECTING EXPOSED CONTACTS CONNECTED TO A BRIDGE RECTIFIER AGAINST ELECTROSTATIC DISCHARGE," filed Jan. 30, 2008, the entire disclosure of which is herein specifically incorporated by reference for all that it discloses and teaches.

BACKGROUND OF THE INVENTION

Electrostatic discharge (ESD) is a common problem for solid state circuits, such as circuits that use both discrete components and integrated silicon components. Electrostatic discharges have extremely fast rise times of 1 ns or less. Peak currents can reach as high as 30 amps and unclamped voltages as high as 15 KV. These high energy discharges have been found to destroy circuit components if these circuit components are not properly protected.

SUMMARY OF THE INVENTION

An embodiment of the present invention may therefore comprise a method of protecting a rectifier circuit from electrostatic pulses that occur between a power pad and an electronic device comprising: connecting a predetermined number of pairs of diodes in series in the same polarity direction to produce a plurality of series pairs of diodes; connecting the plurality of series pairs of diodes in parallel so that cathodes of one diode in each of the series pairs is connected to a positive power line and anodes of the other diode in each of the series pairs of diodes is connected to a negative power line; providing a predetermined number of contacts on the electronic device; connecting the predetermined number of contacts to input nodes located between the predetermined number of pairs of diodes; connecting a plurality of first bypass capacitors between the positive power line and the negative power line, proximate to each of the series pairs of diodes, to function as a bypass for the electrostatic pulses that have a rise time that allows the diodes to conduct and prevent damage to the diodes as a result of reverse biasing; connecting a plurality of second bypass capacitors between the input node and the negative power line, proximate to the input node, to discharge the electrostatic pulses, that have a rise time that is faster than the turn-on time of the diodes, to the negative power line.

An embodiment of the present invention may further comprise a method of protecting a rectifier circuit from electrostatic pulses that occur between a power pad and an electronic device comprising: connecting a predetermined number of pairs of diodes in series in the same polarity direction to produce a plurality of series pairs of diodes; connecting the plurality of series pairs of diodes in parallel with cathodes of one diode in each of the series pairs connected to a positive power line and anodes of the other diode in each of the series pairs connected to a negative power line; providing a predetermined number of contacts on the electronic device; connecting the predetermined number of contacts to input nodes located between the predetermined number of pairs of diodes; connecting a plurality of first bypass capacitors between the positive power line and the negative power line, proximate to each of the series pairs of diodes, to function as a bypass for the electrostatic pulses that have a rise time that allows the diodes to conduct and prevent damage to the diodes as a result of reverse biasing; connecting a plurality of second bypass capacitors between the input node and the positive power line, proximate to the input node, to discharge the electrostatic pulses, that have a rise time that is faster than the turn-on time of the diodes, to the positive power line.

An embodiment of the present invention may further comprise a rectifier circuit that is protected from electrostatic pulses that are applied to an electronic device from a power pad comprising: a plurality of pairs of diodes that are connected in series in the same polarity direction, the pairs of diodes being connected in parallel, with cathodes of one diode in each of the pairs connected to a positive power line, and anodes of the other diode in each of the pairs connected to a negative power line; an input node located between the pairs of diodes that are connected in series; power contacts that are connected to the input nodes; a first bypass capacitor that is connected between the positive power line and the negative power line, proximate to each of the pairs of diodes, that functions as a bypass for the electrostatic pulses that have a rise time that allows the diodes to conduct and prevent damage to the diodes as a result of reverse biasing; a second bypass capacitor that is connected between the input node and the negative power line, proximate to the input node, to discharge the electrostatic pulses, that have a rise time that is faster than the turn-on time of the diodes, to the negative power line.

An embodiment of the present invention may further comprise a rectifier circuit that is protected from electrostatic pulses and that are applied to an electronic device from a power pad comprising: a plurality of pairs of diodes that are connected in series in the same polarity direction, the pairs of diodes being connected in parallel, with cathodes of one diode in each of the pairs connected to a positive power line, and anodes of the other diode in each of the pairs connected to a negative power line; an input node located between the pairs of diodes that are connected in series; power contacts that are connected to the input nodes; a first bypass capacitor that is connected between the positive power line and the negative power line, proximate to each of the pairs of diodes, that functions as a bypass for the electrostatic pulses that have a rise time that allows the diodes to conduct and prevent damage to the diodes as a result of reverse biasing; a second bypass capacitor that is connected between the input node and the positive power line, proximate to the input node, to discharge the electrostatic pulses, that have a rise time that is faster than the turn-on time of the diodes, to the positive power line.

An embodiment of the present invention may further comprise a rectifier circuit disposed in an electronic device that is protected from electrostatic pulses comprising: diode means for rectifying an input signal and applying the input signal to a positive power line and a negative power line depending upon the polarity of the input signal; first bypass capacitor means for providing a low impedance path for high frequency signals between the positive power line and the negative power line that discharges the electrostatic pulses applied to the rectifier circuit wherever the diode means has a response time that is sufficient to conduct the electrostatic pulses; second bypass capacitor means for providing a low impedance path between an input node of the rectifier circuit and the negative power line that discharges the electrostatic pulses that have a rise time that is faster than the turn-on time of the diode means.

An embodiment of the present invention may further comprise a rectifier circuit that is protected from electrostatic pulses and that is used to charge an electronic device from a power pad comprising: a plurality of pairs of diodes that are connected in series in the same polarity direction, the pairs of diodes being connected in parallel, with cathodes of one of the diodes in each of the pairs connected to a positive power line, and anodes of the other of the diodes in each of the pairs connected to a negative power line; an input node located between the pairs of diodes that are connected in series; power contacts that are connected to the input nodes; a first bypass capacitor that is connected between the positive power line and the negative power line, proximate to each of the pairs of diodes, that functions as a bypass for the electrostatic pulses that have a rise time that allows the diodes to conduct and prevent damage to the diodes as a result of reverse biasing; a second bypass capacitor that is connected between the input node and the positive power line, proximate to the input node, to discharge the electrostatic pulses, that have a rise time that is faster than the turn-on time of the diodes, to the negative power line.

An embodiment of the present invention may further comprise a mechanical discharge device for discharging electrostatic pulses between a power pad and contacts on a portable electronic device comprising: a contact disposed in an opening in a surface of the portable electronic device; a spring that bias the contact in the opening so that a portion of the contact protrudes from the surface of the electronic device and retracts when the portable electronic device is placed on the power pad; a discharge conductor adjacent to the contact that electrically connects the contact to ground potential, when the contact protrudes from the surface, to discharge the electrostatic pulses between the contact and the power pad, and electrically disconnects from the contact, when the connector retracts.

An embodiment of the present invention may further comprise a method of protecting circuitry in a portable electronic device from electrostatic pulses comprising: providing a contact that is disposed in an opening in a surface of the portable electronic device; biasing the contact with a spring so that the contact protrudes through the opening and so that the contact retracts from the opening when the portable electronic device is placed on a surface; providing a grounding conductor, adjacent to the contact, that electrically connects the contact to ground potential whenever the contact is biased by the spring to protrude through the opening; placing the portable electronic device on a power pad so that the contact touches the power pad, while the contact is biased to protrude from the opening and connected to the ground potential, causing the electrostatic pulses to initially discharge to the ground potential from the contact through the grounding conductor; electrically disconnecting the contact from the grounding conductor when the contact retracts.

An embodiment of the present invention may further comprise a mechanical discharge device for discharging electrostatic pulses between a power pad and contacts on a portable electronic device comprising: contact means disposed in an opening in a surface of the portable electronic device; spring means for biasing the contact in the opening so that a portion of the contact protrudes from the surface of the electronic device and retracts when the portable electronic device is placed on the power pad; discharge conductor means adjacent to the contact electrically connecting the contact to ground potential, when the contact protrudes from the surface, to discharge the electrostatic pulses between the contact and the power pad, and electrically disconnecting from the contact, when the connector retracts, so that a power signal can be applied from the power pad through the contact to the portable electronic device.

DETAILED DESCRIPTION OF THE EMBODIMENTS

Figure 1:
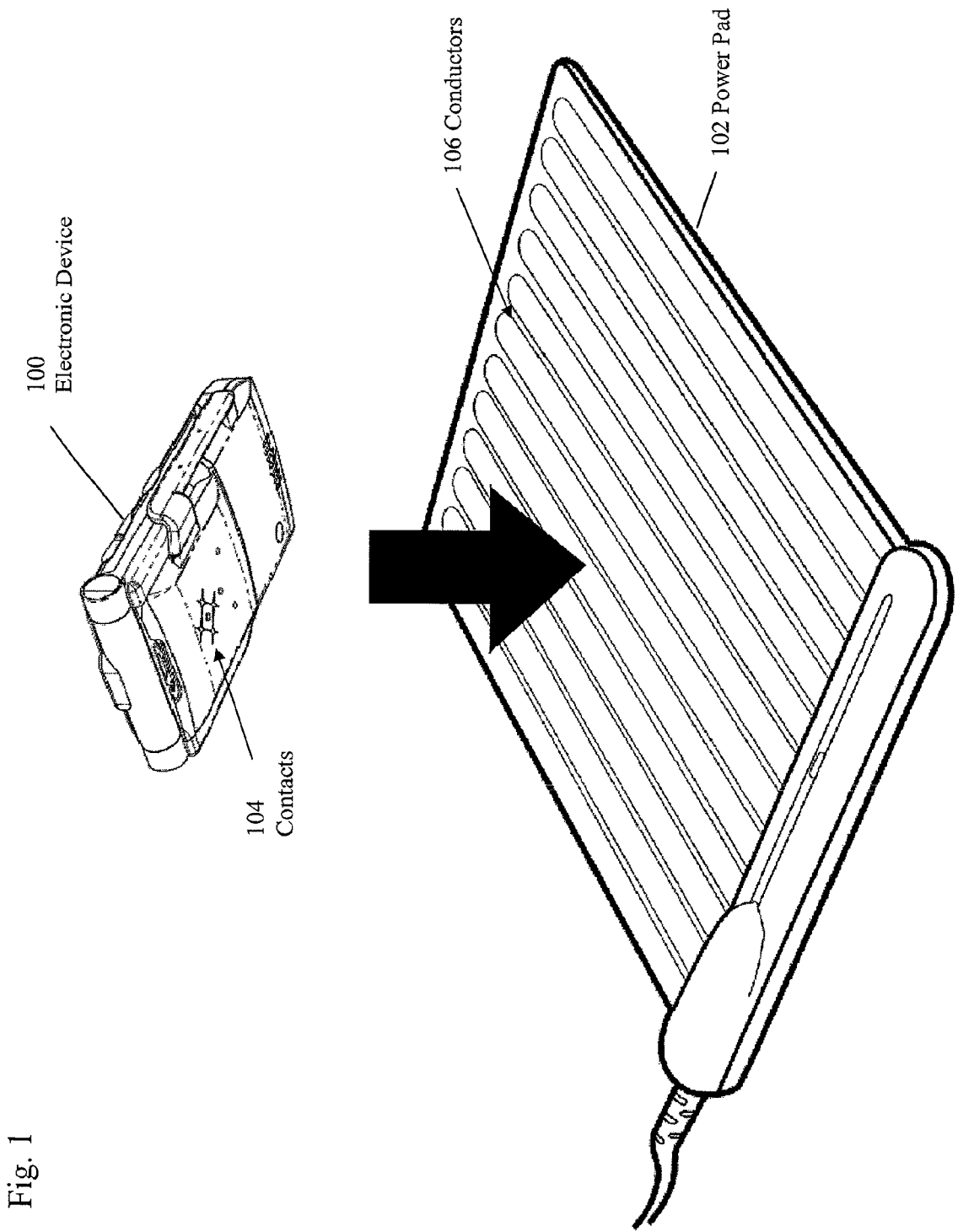
FIG. 1 is a schematic perspective view illustrating a device in which the present invention may be implemented.

FIG. 1 is a schematic perspective view of a system for charging and/or providing power to an electronic device 100. As shown in FIG. 1, a power pad 102 contains a plurality of conductors for charging and/or providing power to the electronic device 100. Electronic device 100 can comprise devices such as cell phones, MP3 players, video players, smart phones, satellite phones, telematics devices, pagers, monitors, bar code scanners, GPS navigational devices, walkie talkies, personal digital assistants, and various types of computers, including portable computers, handheld computers, laptop computers, ultra-mobile computers, tablet computers, and various hybrid devices that combine one or more of these functions, or any portable electronic device, or other devices that can be charged, such as battery packs, capacitive devices, etc. Various features are more fully disclosed in U.S. patent application Ser. No. 11/672,010, filed Feb. 6, 2007, U.S. patent application Ser. No. 11/682,309, filed Mar. 5, 2007, U.S. patent application Ser. No. 11/800,427, filed May 3, 2007, U.S. patent application Ser. No. 11/670,842, filed Feb. 2, 2007, U.S. Provisional Patent Application Ser. No. 60/979,310, filed Oct. 11, 2007, U.S. Provisional Patent Application Ser. No. 60/979,467, filed Oct. 12, 2007, U.S. patent application Ser. No. 12/251,428, filed Oct. 14, 2008, U.S. Provisional Patent Application Ser. No. 61/018,922, filed Jan. 4, 2008, U.S. patent application Ser. No. 12/348, 881, filed Jan. 5, 2009, U.S. Provisional Patent Application Ser. No. 61/024,773, filed Jan. 30, 2008, U.S. Provisional Patent Application Ser. No. 61/033,223, filed Mar. 3, 2008, U.S. Provisional Patent Application Ser. No. 61/033,229, filed Mar. 3, 2008, U.S. Provisional Patent Application Ser. No. 61/055,510, filed May 23, 2008, U.S. Provisional Patent Application Ser. No. 61/083,475, filed Jul. 24, 2008, U.S. Provisional Patent Application Ser. No. 61/086,515, filed Aug. 6, 2008, U.S. Provisional Patent Application Ser. No. 61/108,784, filed Oct. 27, 2008, and U.S. Provisional Patent Application Ser. No. 61/122,787, filed Dec. 16, 2008, all of which are hereby specifically incorporated herein by reference for all that they disclose and teach. As disclosed in these patent applications, contacts 104 on the electronic device 100 are strategically placed so that there is a 100% probability of at least two of the contacts 104 contacting the conductors 106 on the power pad 102. In that regard, the conductors 106 are sized in relation to the spacing of the contacts 104 to ensure the 100% chance of contact between the conductors 106 and contacts 104.

Figure 2:
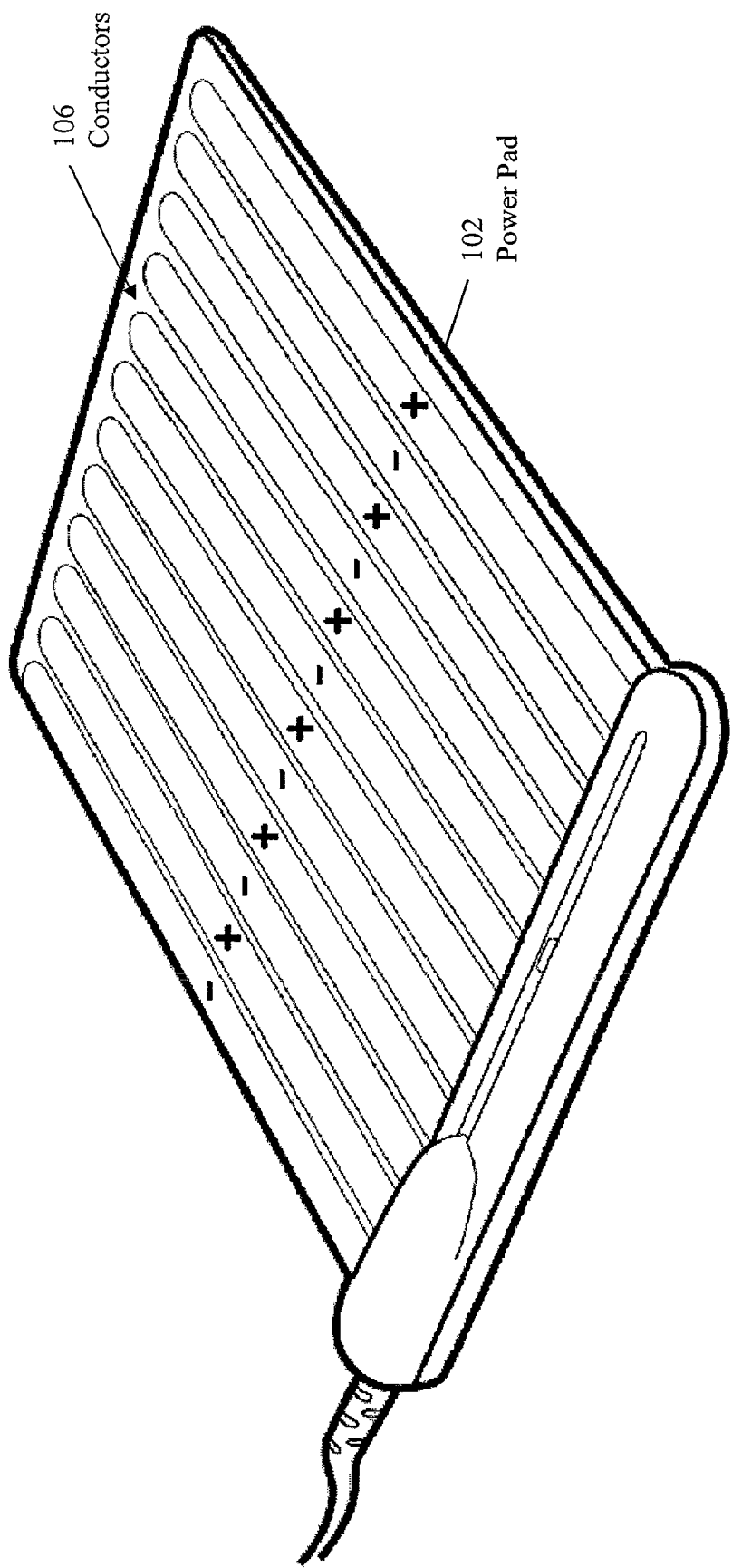
FIG. 2 is a schematic perspective view of a power pad.

FIG. 2 illustrates the manner in which the conductors 106 are laid out on the power pad 102 so that the conductors 106 have alternating polarities. Again, the specific shape and spacing of the layout of the contacts 104 ensures a 100% probability that two of the contacts will touch opposite polarity conductors 106 on the power pad 102.

Figure 3:
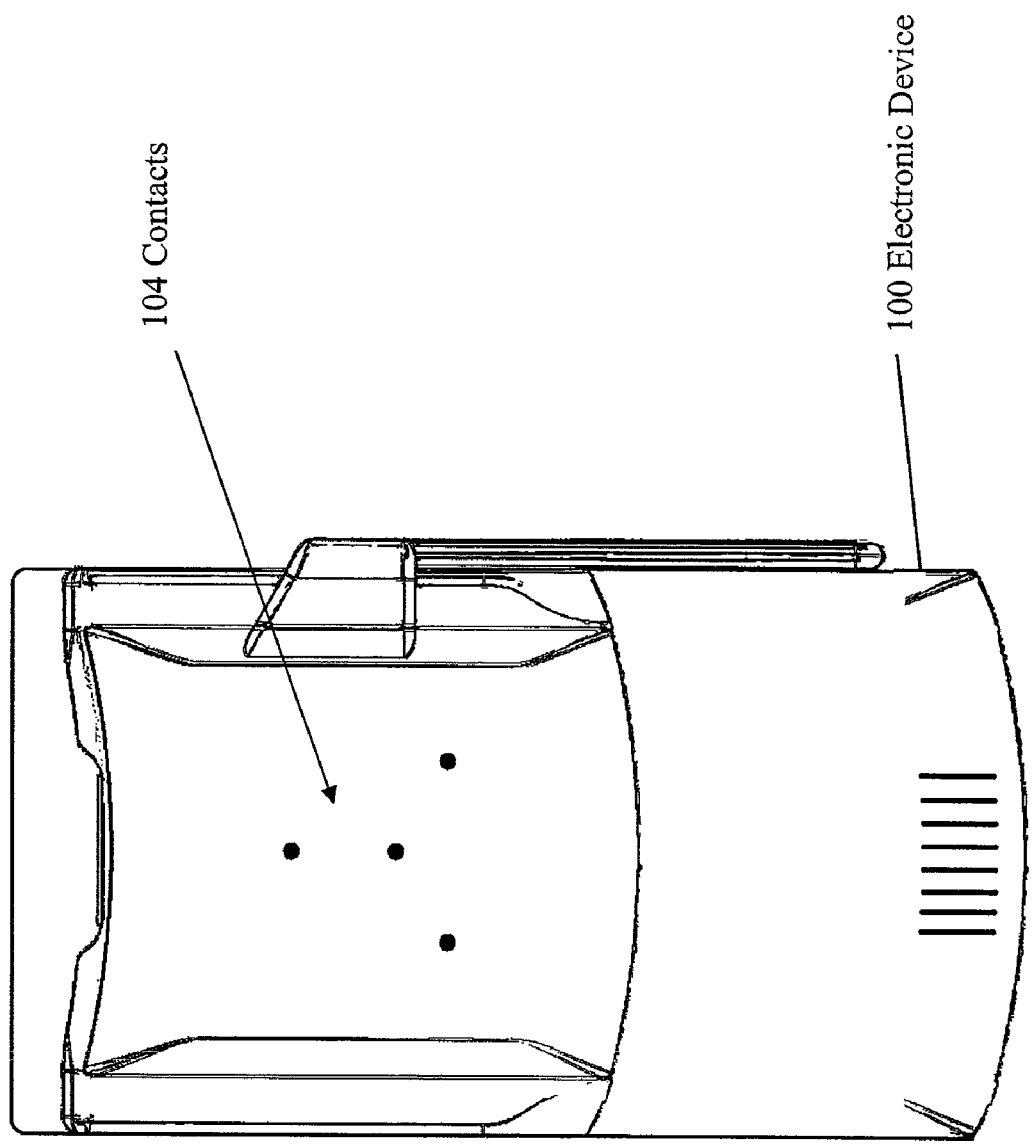
FIG. 3 is a schematic bottom view of an electronic device which may incorporate the present invention.

FIG. 3 is a schematic illustration of the bottom surface of the electronic device 100. As shown in FIG. 3, contacts 104 are laid out in a star-like configuration that is simple and provides the assurance of making the desired contact with the power pad, as disclosed more fully in the above-disclosed applications.

Since the electronic device 100 is a portable device, static electricity can build up on the electronic device 100. When the electronic device 100 is placed onto the power pad 102, which is tied to earth ground, a large electrostatic discharge can occur between the contacts 104 of the electronic device 100 and the conductors 106 of the power pad 102. This electrostatic discharge (ESD) can result in damage to circuitry contained in the electronic device 100.

Figure 4:
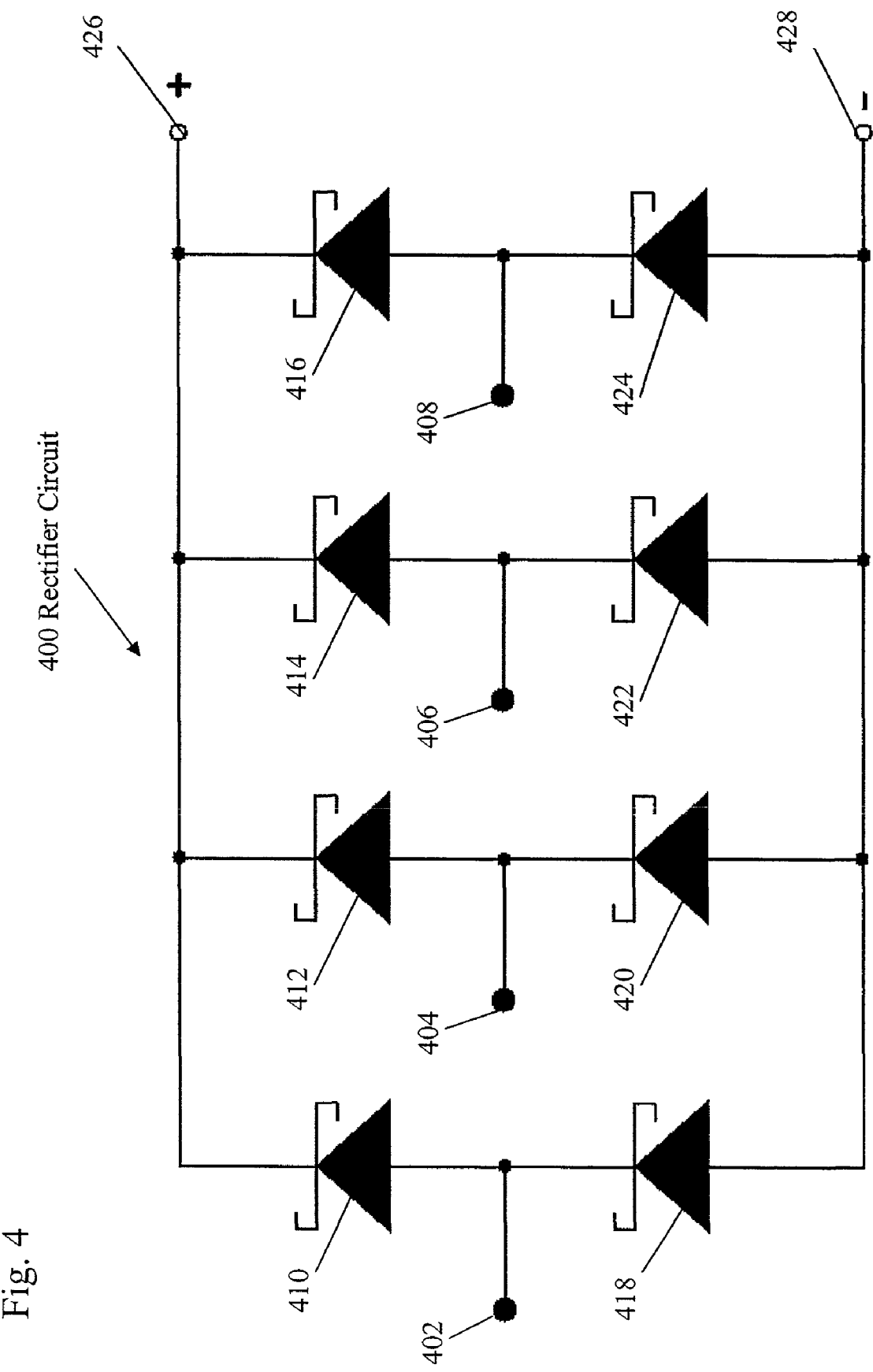
FIG. 4 is a schematic circuit diagram of a rectifier circuit.

FIG. 4 is a schematic circuit diagram of a rectifier circuit 400 that is used to rectify the voltages that are obtained from the contacts 104 to ensure that the contacts apply the proper voltage potential to the proper input. As shown in FIG. 4, there are four sets of series connected Schottky diodes, such as series connected pair 418 and 410, 420 and 412, 422 and 414, and 424 and 416. Although Schottky diodes are shown, any fast reacting diode can be used in place of the Schottky diodes. These series connected pairs of diodes are then connected in parallel, such that the cathodes of the Schottky diodes 410, 412, 414 and 416 are connected to the positive power line 426. Similarly, the anodes of Schottky diodes 418, 420, 422, 424 are connected to the negative power line 428. The cathode of Schottky diode 418 and the anode of Schottky diode 410 are connected to contact 402 via node 403. Similarly, the cathode of diode 420 and the anode of diode 412 are connected to contact 404 of the input node 405. The cathode of Schottky diode 422 and the anode of Schottky diode 414 are connected to contact 406 via input node 407. The anode of Schottky diode 424 and the cathode of Schottky diode 416 are connected to contact 408 via input node 409. Contacts 402, 404, 406 and 408 may correspond to contacts 104 on electronic device 100, as illustrated in FIGS. 1 and 3. Since the negative power line 428 is connected to a ground plane on the electronic device 100 that is a floating ground, electrostatic charges can build on the electronic device 100, which may be discharged through contacts 402, 404, 406 and 408. In the process of discharging the electrostatic charge, damage can occur to both the circuitry attached to the rectifier circuit 400 and to the Schottky diodes illustrated in FIG. 4.

The Schottky diodes illustrated in FIG. 4 are discreet components that are connected together with wires. In high frequency applications, including the discharge of electrostatic charges, the wires that connect the Schottky diodes exhibit stray inductance that affects the manner in which the circuit 400 of FIG. 4 functions.

Figure 5:
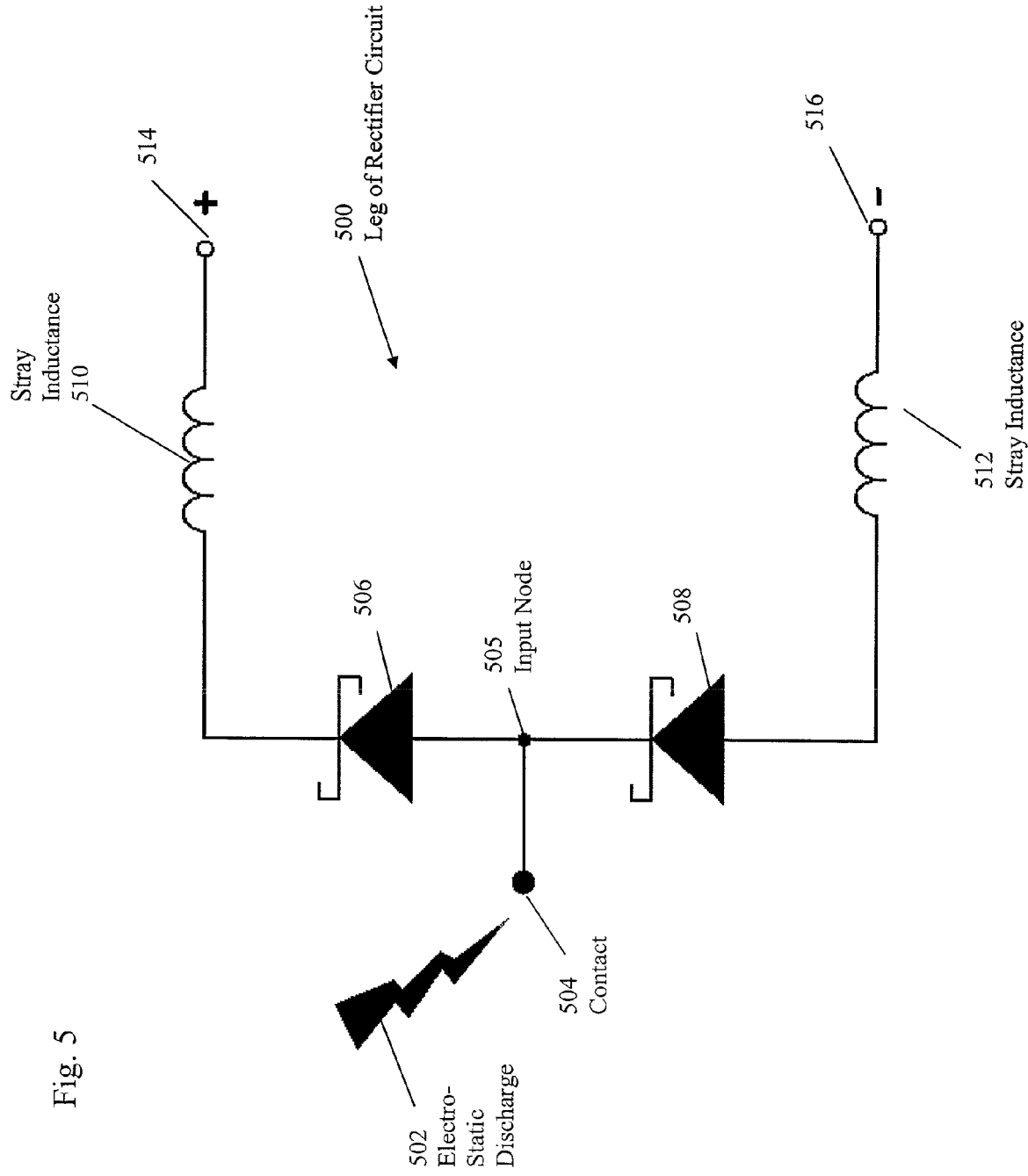
FIG. 5 is a schematic circuit diagram of one leg of a rectifier circuit.

Referring to FIG. 5, one leg of the rectifier circuit 400, illustrated in FIG. 4, is illustrated. As shown in FIG. 5, an electrostatic discharge 502 may occur between the contact 504 and another device, such as the power pad 102. Contact 504 can also discharge on other grounded or metal surfaces or conductors.

As disclosed above, electrostatic discharges, such as electrostatic discharge 502, may have a rise time of approximately 1 ns or less. Schottky diodes, such as Schottky diodes 506, 508, may have a response time that is sufficient to conduct the electrostatic discharge. Other types of diodes that have fast response times can also be used in the rectifier circuit. In the ideal case, a positive, high-voltage, transient, electrostatic discharge 502 would cause Schottky diode 506 to go into forward conduction, clamping the voltage at the input node 505 to the positive supply voltage 514. The reverse bias voltage of diode 508 would then be the same voltage as the voltage at node 514. However, if Schottky diode 506 were unable to turn-on fast enough, then a very high reverse voltage may briefly exist across Schottky diode 508. Often, overvoltages, such as a high reverse voltage across Schottky diode 508, does not immediately destroy the diode, but instead, causes microscopic damage that accumulates over time to eventually cause catastrophic failure of the diode. A negative high voltage transient would have a similar effect on Schottky diode 506. For these reasons, it is desirable to use Schottky diodes that have a turn-on time that is capable of conducting fast rise time electrostatic pulses, so that the electrostatic pulses can be clamped at the supply voltage levels and prevent damage to the rectifier circuit. For example, Schottky diodes, such as the MBR0540 available from Fairchild Semiconductor, can be used in the bridge rectifier that have extremely fast turn-on times. Although manufacturers typically do not provide data regarding the ability of Schottky diodes to handle current spikes, it has been empirically determined that the MBR0540, which is rated for 0.5 amps continuous current, is able to tolerate an indefinite number of 30 amp ESD current spikes.

As also illustrated in FIG. 5, the trace lengths of the wires in the rectifier circuit from the Schottky diodes to the power circuit are sufficiently long that stray inductance, such as stray inductance 510, 512, is realized in response to the very fast rise time of the electrostatic discharge 502. If a positive-going electrostatic discharge 502 is applied to contact 504, stray inductance 510 will prevent the voltage at input node 505 from being clamped to the positive voltage at node 514. The stray inductance 510 appears as an open circuit to the positive going electrostatic discharge 502 and causes a very high reverse breakdown voltage across Schottky diode 508. This high reverse breakdown voltage will degrade Schottky diode 508. If an electrostatic discharge 502 is a negative-going electrostatic discharge, stray inductance 512 appears as an open circuit and a high reverse breakdown voltage across Schottky diode 506 will cause degradation of Schottky diode 506. Hence, even though Schottky diodes 506 and 508 are fast enough to conduct the electrostatic discharge 502 in a forward-going direction, high reverse voltages, due to stray inductances, such as stray inductances 510, 512, will cause the Schottky diodes 506, 508 to degrade.

Figure 6:
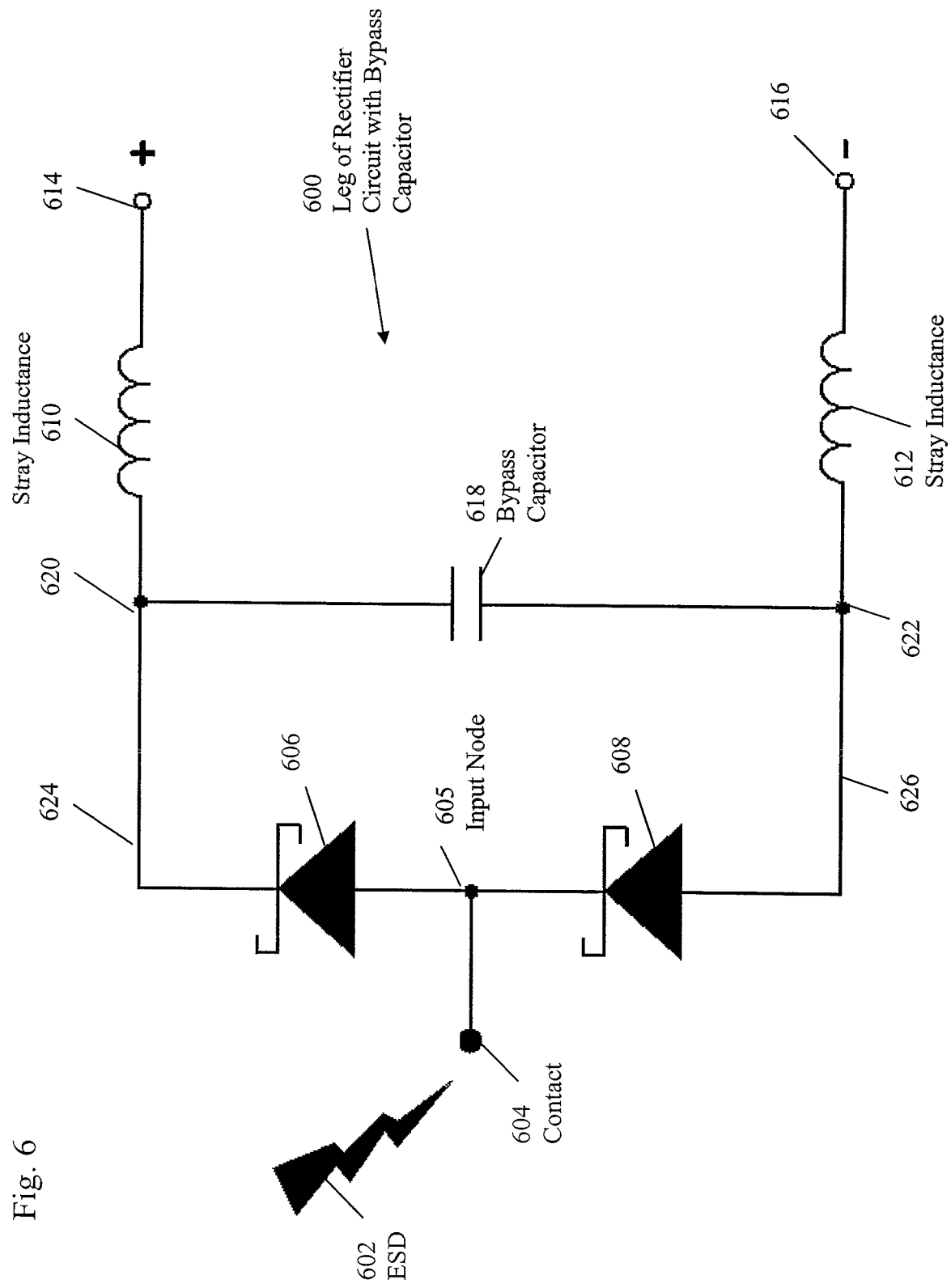
FIG. 6 is a schematic circuit diagram of one leg of a rectifier circuit with a bypass capacitor.

FIG. 6 is a schematic circuit diagram of a leg of a rectifier circuit 600 that utilizes a bypass capacitor 618 that protects the Schottky diodes 606, 608 from damage due to high reverse breakdown voltages during an ESD event. The bypass capacitor 618 may comprise a surface mount capacitor, such as a 0.1 microfarad capacitor, which is suitable for eliminating the problem of stray inductance due to the length of the wires 624, 626 extending from the rectifiers 606, 608, respectively, to the power circuit. The bypass capacitor 618 is connected to the wire 624 at node 620 and wire 626 at node 622, such that nodes 620, 622 are located as close as possible to diodes 606, 608, respectively. In this manner, stray inductance on wires 624, 626 prior to reaching nodes 620, 622, respectively, will be minimized. In effect, the bypass capacitor 618 appears as a short circuit to fast transients that prevents high reverse breakdown voltages that would otherwise appear at input node 605 due to stray inductances 610, 612.

Figure 7:
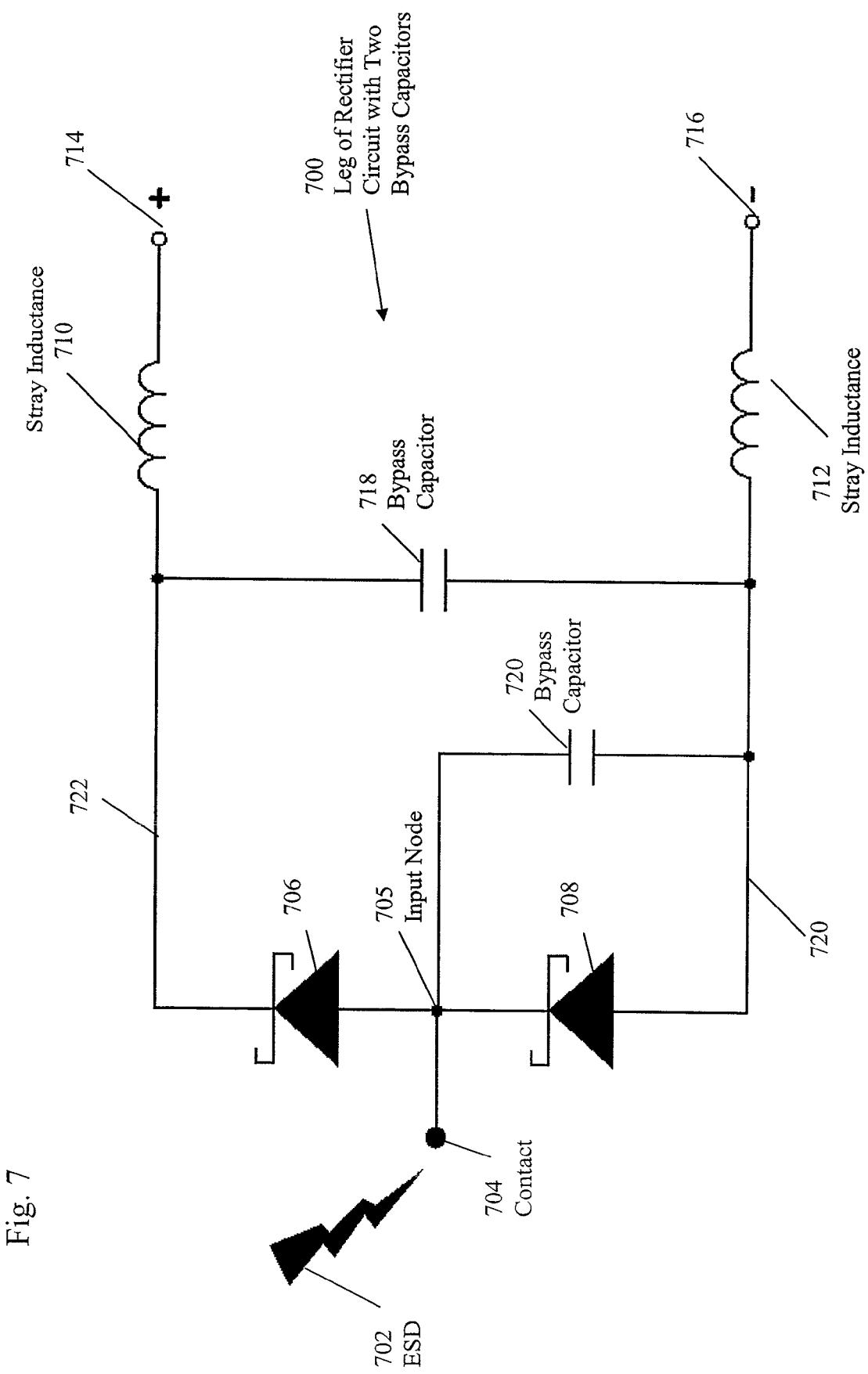
FIG. 7 is a schematic circuit diagram of a single leg of a rectifier circuit having two bypass capacitors.

FIG. 7 is a schematic illustration of a leg of a rectifier circuit 700 with two bypass capacitors. In some cases, it has been found that even the fastest diodes cannot react sufficiently fast to protect the other diode in the series connected pair of diodes in the rectifier circuit from high reverse breakdown voltages. This problem can be avoided by the addition of a bypass capacitor 720 that is connected between input node 705 and the negative power line 720. Very fast transient pulses, such as an electrostatic discharge 702 which is applied to contact 704, are shunted to the ground potential (negative power line 720). The addition of capacitance to the input node 705, decreases the violent transients of the ESD 702 that have a rise time that is faster than the turn-on time of diodes 706, 708. A typical value for bypass capacitor 720 may be 22 pF. It has been empirically found that the capacitance of bypass capacitor 720 should not exceed approximately 27 pF since the additional capacitance exhibited at contact 704 may function to turn off the power pad 102 (FIGS. 1 and 2), which contains automatic turn-off circuitry to prevent shocks to users. The automatic turn-off circuitry of power pad 102 detects capacitance from a human touching the pad and quickly turns off the charge to the pad to prevent a user from being shocked. If the capacitance at input node 705 is too high, the pad may automatically turn off as a result of detecting the capacitance of bypass capacitor 720 as capacitance from a human touching the power pad 102.

The circuit 700, illustrated in FIG. 7, also includes a bypass capacitor 718 to protect the diode 706, 708 from high transient reverse breakdown voltages. Of course, the wire connectors 720, 722 are still subject to the stray inductances 712, 710, respectively, which act as open circuits to fast rise time electrostatic pulses, and prevent transient voltages from being clamped at the charging voltage nodes 716, 714. Essentially, the bypass capacitor 720 is a small capacitor that simply allows the diodes 706, 708 sufficient time to conduct and allow bypass capacitor 718 to ensure that the transient electrostatic pulse does not place a high reverse voltage across either diode 706 or 708.

Figure 8:
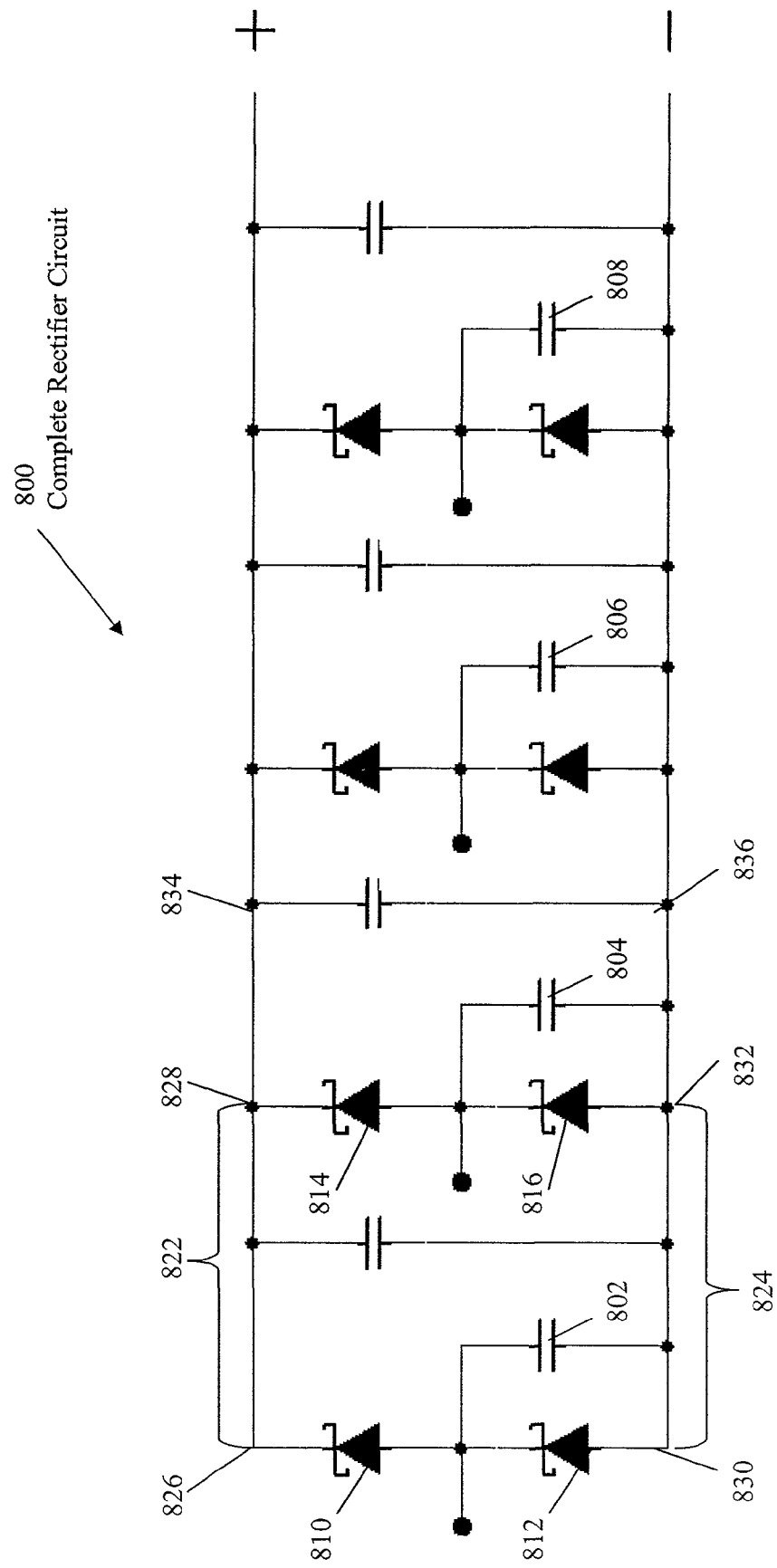
FIG. 8 is a schematic circuit diagram of a complete rectifier circuit employing the two capacitor bypass configuration of FIG. 7.
Figure 13:
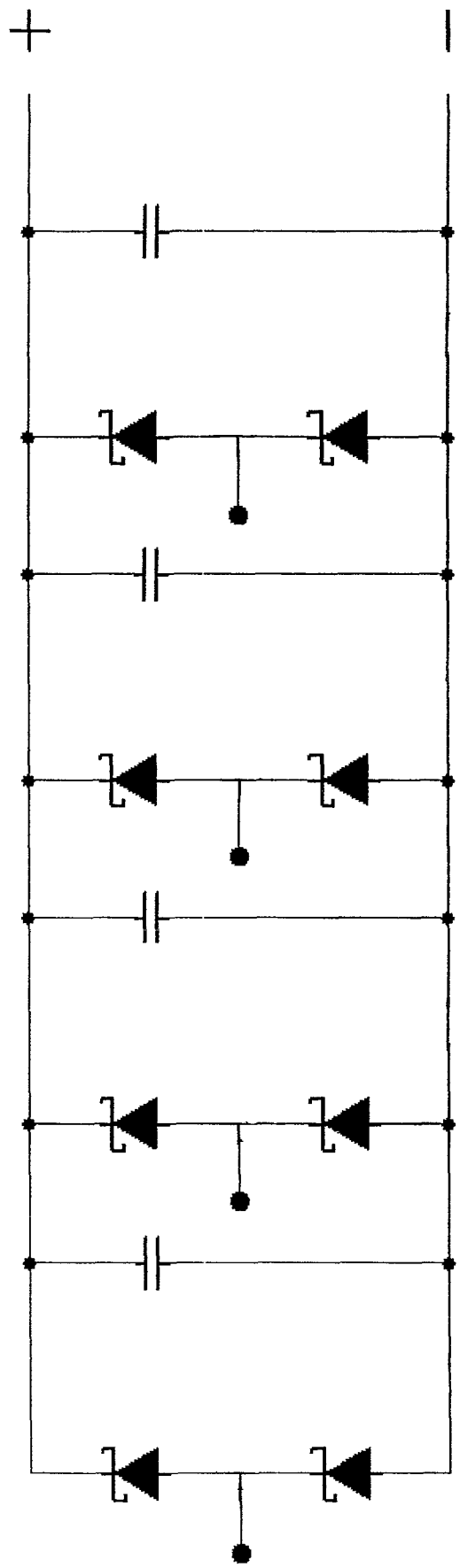
FIG. 13 is a schematic diagram of another embodiment of a rectifier circuit using a single bypass capacitor for each series pair of diodes.

FIG. 8 is a schematic circuit diagram of a complete rectifier circuit 800. Each of the diode pairs has two bypass capacitors associated with these pairs. In this manner, all of the diode pairs are protected from electrostatic discharges. Depending upon the exact layout of the components, and the sizing of the components, in some cases the smaller bypass capacitor 720 (FIG. 7) may not be needed. In that case, the complete rectifier schematic would not include the four bypass capacitors 802, 804, 806 and 808, as illustrated in FIG. 13. Further, if the layout permits one series pair of diodes to be located very close to another set of series pairs of diodes, a single bypass capacitor can be used for both sets of series pairs of diodes.

Figure 14:
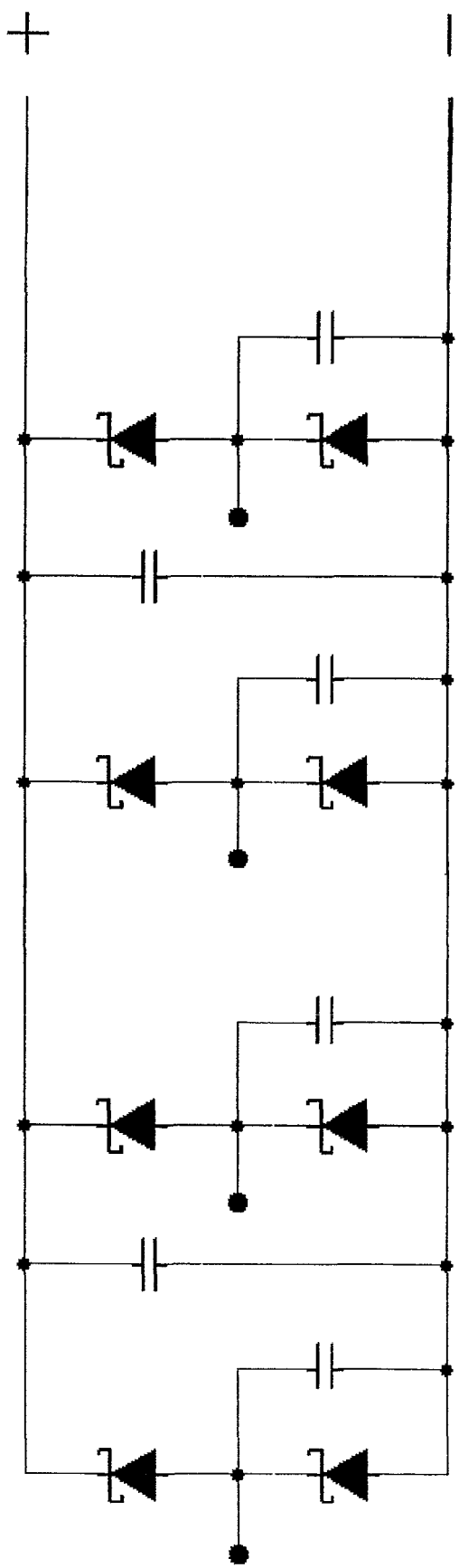
FIG. 14 is a schematic circuit diagram of another embodiment of a rectifier circuit that utilizes a single bypass capacitor for two series pairs of rectifier diodes.

For example, as illustrated in FIG. 8, if the length of wire 822 between nodes 826 and 828 is short and the length of wire 824 between nodes 830 and 832 is short, and the capacitor 818 can be connected between the two, capacitor 820 may be eliminated. FIG. 14 illustrates such a circuit. Alternatively, capacitor 818 may be eliminated if there is no room for connection of capacitor 818 on the length of wire 822 and 824, and nodes 834, 836 can be connected very close to nodes 828 and 832, respectively.

Figure 9:
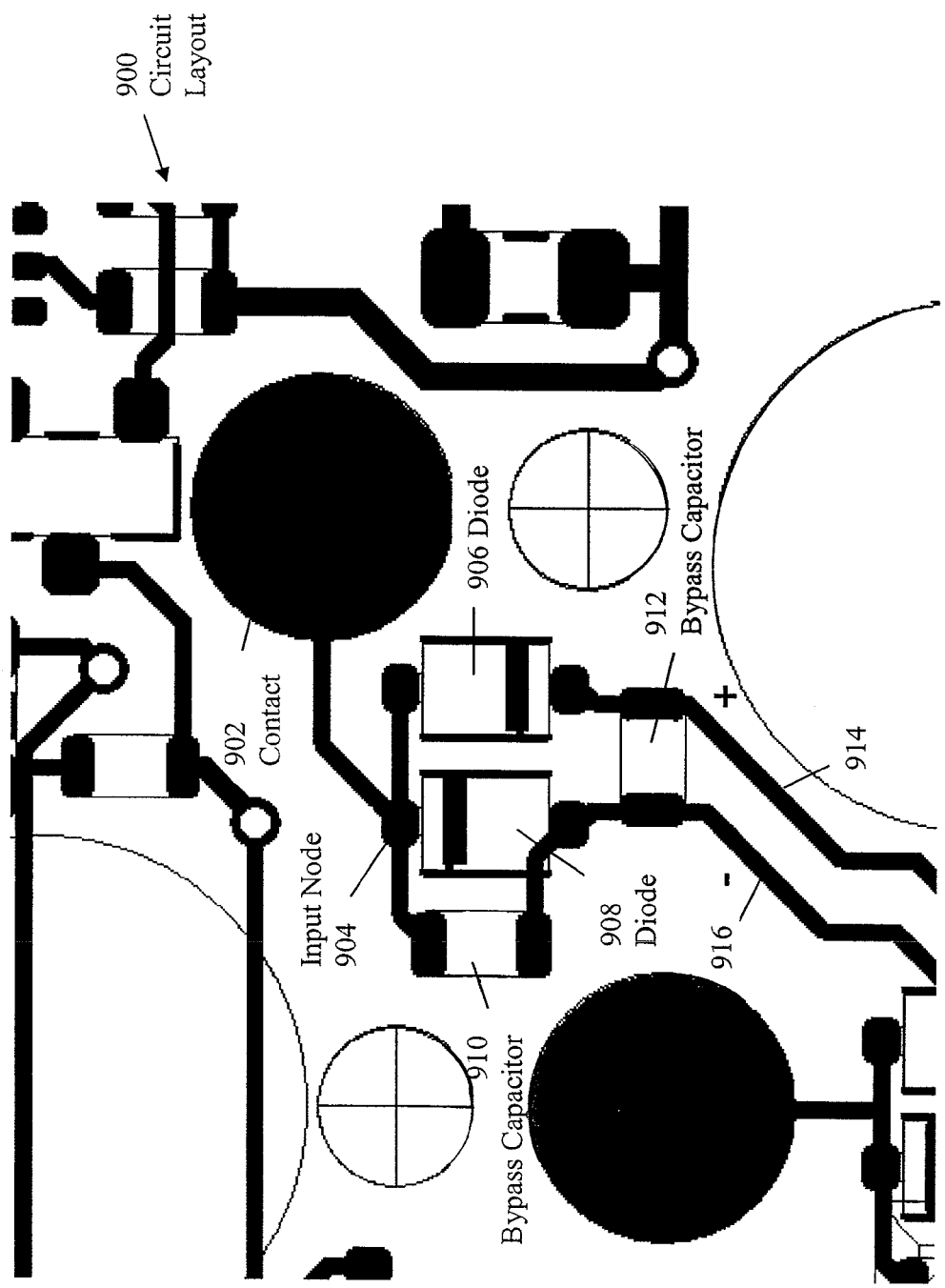
FIG. 9 is a schematic representation of a layout using the two capacitor bypass configuration of FIG. 7.

FIG. 9 is a schematic representation of a circuit layout 900. As shown in FIG. 9, contact 902 is connected to an input node 904. Diodes 906, 908 are connected to the input node 904. Diode 906 is connected to the positive power line 914, while diode 908 is connected to the negative power line 916. Bypass capacitor 912 is coupled between power lines 914 and 916, as close as possible to diodes 906, 908. Bypass capacitor 910 is connected directly to the input node 904 and to the negative power line 916 adjacent to, and in parallel with, diode 908. In this manner, stray inductance of the lines 914, 916 is substantially eliminated, and the bypass capacitor 912, as well as bypass capacitor 910, can bypass and negate the effects of fast transient electrostatic discharges.

Figure 10:
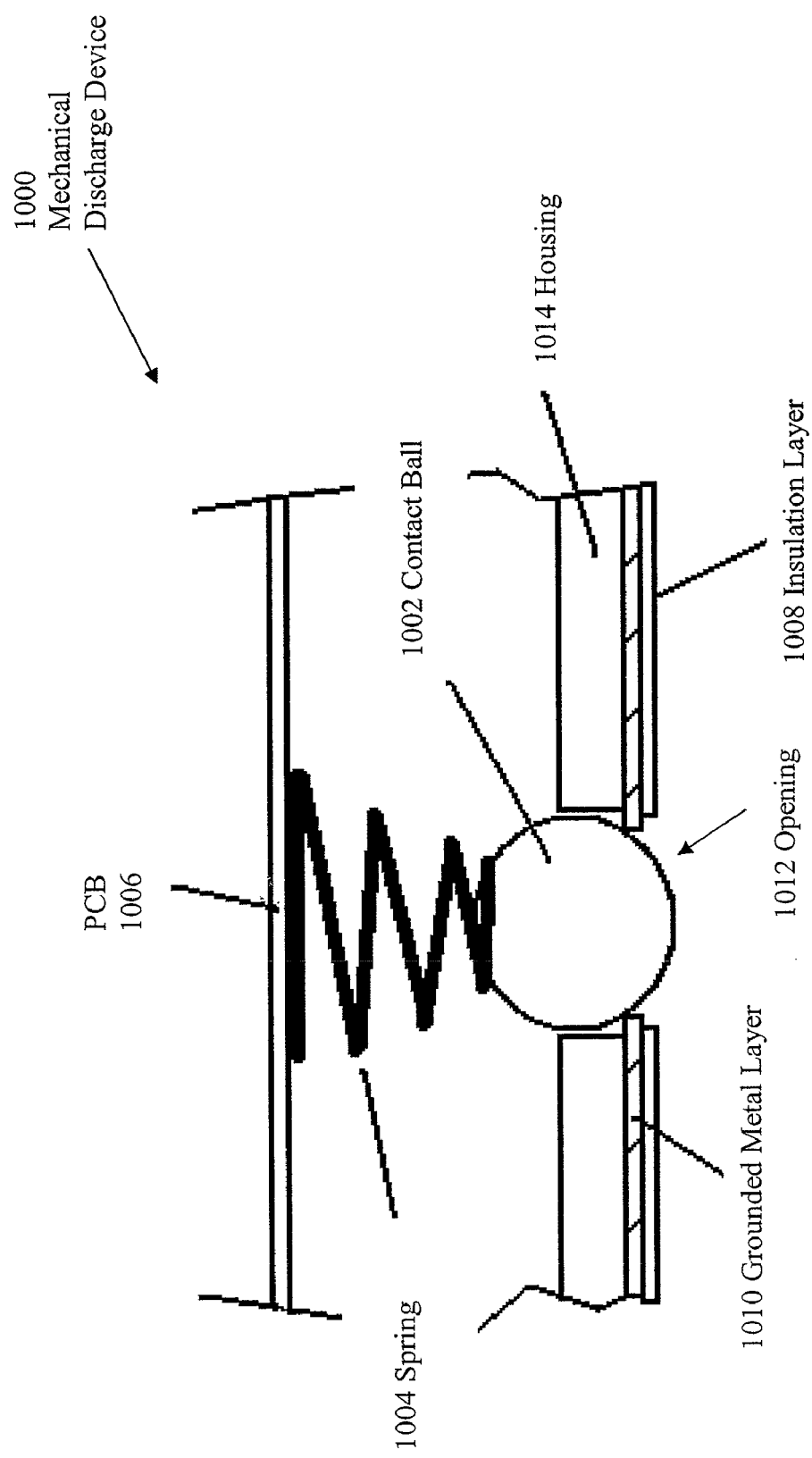
FIG. 10 is a schematic side cutaway view of an embodiment of a mechanical discharge device.

FIG. 10 is a schematic cutaway view of an embodiment of a mechanical discharge device 1000. As shown in FIG. 10, a contact ball 1002 is biased by a spring 1004 in an opening 1012 in housing 1014 so that the contact ball 1002 protrudes from the opening 1012 of the housing 1014. The spring 1004 may be electrically connected to a power line on the printed circuit board 1006. A grounded metal layer 1010 is disposed adjacent to the housing 1014 and provides a smaller opening than the opening in the housing 1014, while still allowing the contact ball 1002 to protrude below the surface of the insulation layer 1008. When the electronic device is placed on a surface, the contact ball 1002 initially touches the surface and conducts any electrostatic pulses to the grounded metal layer 101. Spring 1004 has a bias force that allows the contact ball 1002 to retract under the weight of the electronic device when the electronic device is placed on a surface. When the contact ball 1002 retracts in the housing 1014, the contact ball 1002 no longer contacts the grounded metal layer 1010. However, the contact ball 1002 still contacts the surface. If the surface is a power pad, such as power pad 102, illustrated in FIGS. 1 and 2, a charge can be conducted through the metal contact ball 1002 through the metal spring 1004 to the printed circuit board 1006 to charge the electronic device 100. Insulation layer 1008 provides insulation between the power pad and the grounded metal layer 1010.

Alternatively, the spring 1004 does not necessarily have to be connected to a charging lead on the printed circuit board 1006. Rather, the contact ball 1002 can simply be a separate device that discharges the electrostatic pulses to the grounded metal layer 1010. Further, the contact ball 1002 does not necessarily have to be a ball. For example, contact ball 1002 can be a contact pin or have another shape, as long as the contact is capable of protruding through the insulation layer 1008 and contacting the metal layer 1010, while also being able to retract and disconnect from the grounded metal layer 1010. In that regard, any desired shape can be used in place of the contact ball 1002.

Figure 11:
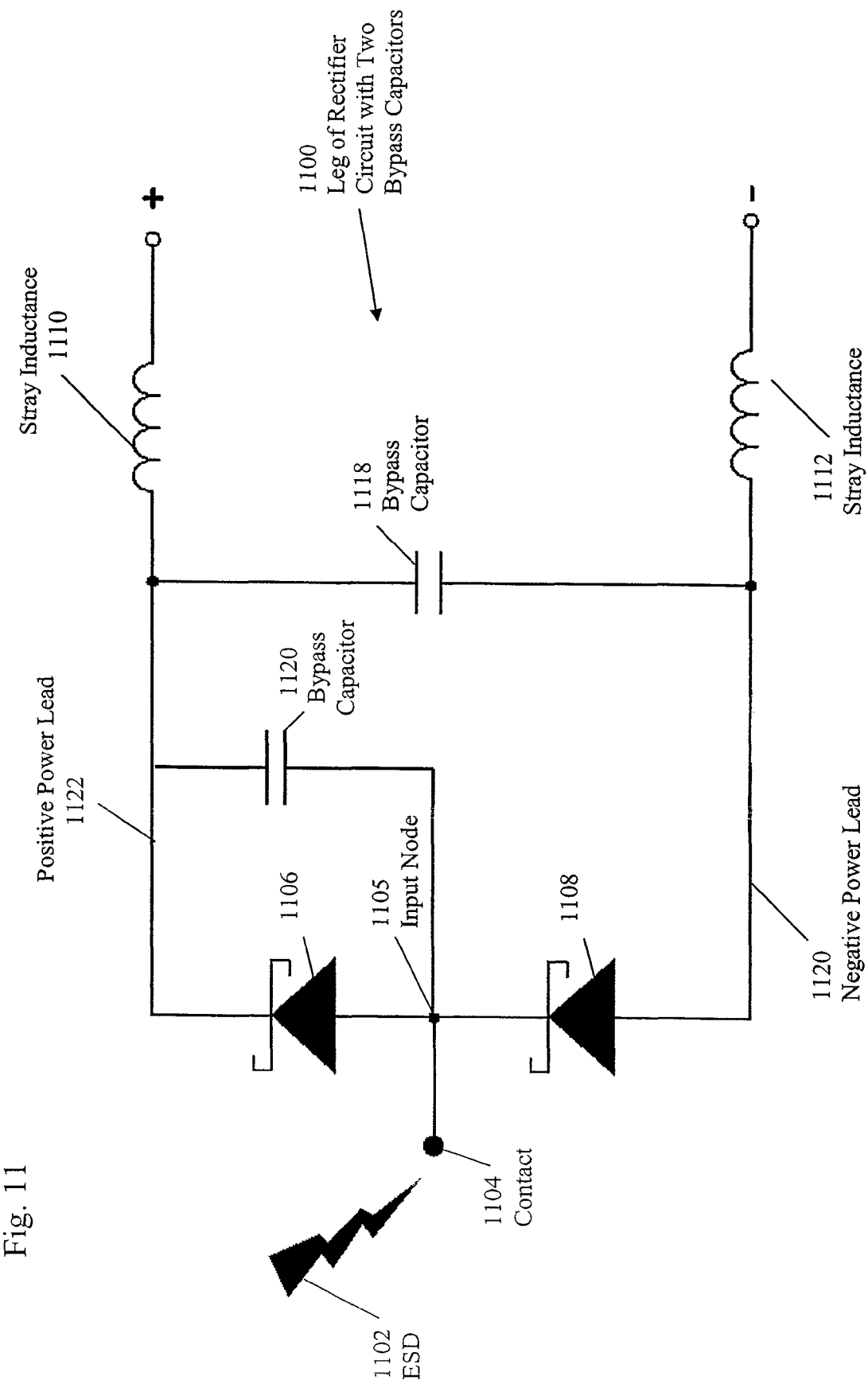
FIG. 11 is a schematic circuit diagram of another embodiment of a leg of a rectifier circuit with two bypass capacitors.

FIG. 11 is a schematic circuit diagram of another embodiment of a leg of a rectifier circuit 1100 with two bypass capacitors. As shown in FIG. 11, an electrostatic discharge 1102 may discharge onto contact 1104, in the manner described above, and be transmitted to the input node 1105. If the diodes, such as Schottky diodes 1106, 1108, are sufficiently fast to conduct the electrostatic pulse, bypass capacitor 1118 will shunt the pulse to either positive power lead 1122 or negative power lead 1124, depending upon the polarity of the electrostatic pulse. The pulse will then be clamped to the voltage on either the positive power lead 1122 or the negative power lead 1124. Hence, bypass capacitor 1118 clamps the voltage at the input node 1105 to either the voltage of the positive power lead 1122 or the negative power lead 1124. If the electrostatic discharge 1102 has a rise time that is faster than the turn-on time of the diodes 1106, 1108, bypass capacitor 1120 provides sufficient capacitance to the input node 1105 to allow the diodes 1106, 1108 to turn on. In effect, the bypass capacitor 1120 clamps the voltage at the input node 1205 to the voltage on the positive power lead 1122. Stray inductances 1110, 1112 exist in the power leads as a result of the fast transient rise time of the electrostatic discharge.

Figure 12:
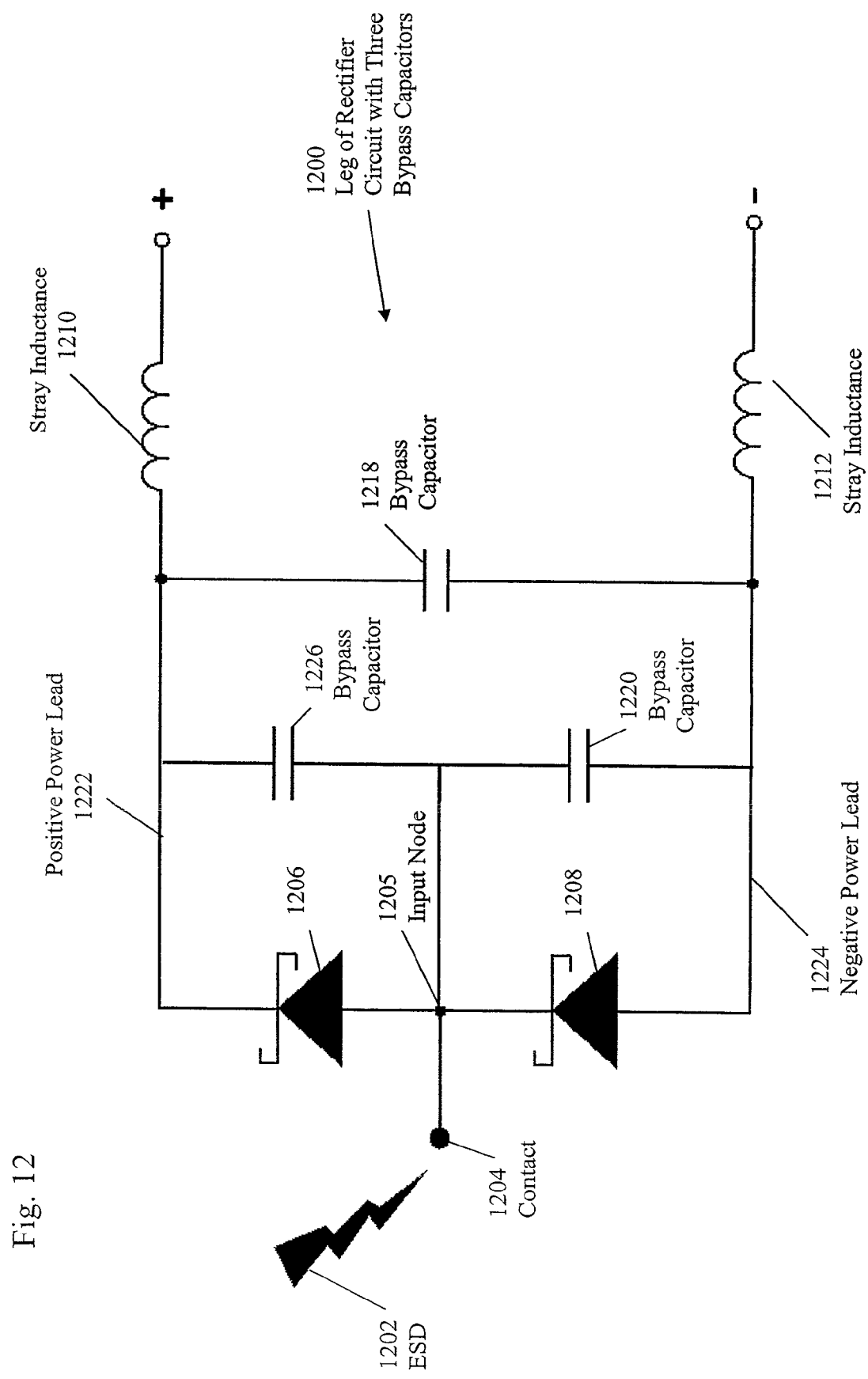
FIG. 12 is a schematic circuit diagram of another embodiment of a leg of a rectifier circuit using three bypass capacitors.

FIG. 12 is a schematic circuit diagram of another embodiment of a leg of a rectifier circuit 1200 using three bypass capacitors. As shown in FIG. 12, an electrostatic discharge 1202 may discharge onto contact 1204, in the manner described above, and be transmitted to the input node 1205. If the diodes, such as Schottky diodes 1206, 1208, are sufficiently fast to conduct the electrostatic pulse, bypass capacitor 1218 will shunt the pulse to either positive power lead 1222 or negative power lead 1224, depending upon the polarity of the electrostatic pulse. The pulse will then be clamped to the voltage on either the positive power lead 1222 or negative power lead 1224. Bypass capacitor 1218 clamps the voltage at input node 1205 to either the voltage of the positive power lead 1222 or the negative power lead 1224. Hence, high reverse voltages do not occur across either diode 1208 or diode 1206. If the electrostatic discharge 1202 has a rise time that is faster than the turn-on time of the diodes 1206, 1208, bypass capacitors 1226, 1220 provide sufficient capacitance to the input node 1205 to allow the diodes 1206, 1208 to turn on. In effect, the bypass capacitors 1226, 1220 clamp the voltage at the input node 1205 to either the voltage on the positive power lead 1222 or the voltage on the negative power lead 1224, respectively. Stray inductance 1210, 1212 exists at high frequencies because of the fast rise time of the electrostatic pulse. Stray inductances 1210, 1212 appear as open circuits to the electrostatic pulse.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of protecting a rectifier circuit from electrostatic pulses that occur between a power pad and an electronic device comprising:
    connecting a predetermined number of pairs of diodes in series in the same polarity direction to produce a plurality of series pairs of diodes;
    connecting said plurality of series pairs of diodes in parallel so that cathodes of one diode in each of said series pairs is connected to a positive power line and anodes of the other diode in each of said series pairs of diodes is connected to a negative power line;
    providing a predetermined number of contacts on said electronic device;
    connecting said predetermined number of contacts to input nodes located between said predetermined number of pairs of diodes;
    connecting a plurality of first bypass capacitors between said positive power line and said negative power line, proximate to each of said series pairs of diodes, to function as a bypass for said electrostatic pulses that have a rise time that allows said diodes to conduct and prevent damage to said diodes as a result of reverse biasing;
    connecting a plurality of second bypass capacitors between said input node and said negative power line, proximate to said input node, to discharge said electrostatic pulses, that have a rise time that is faster than the turn-on time of said diodes, to said negative power line.

2. The method of claim 1 further comprising:
    connecting a plurality of third bypass capacitors between said input node and said positive power line, proximate to said input node, to discharge said electrostatic pulses that have a rise time that is faster than said turn-on time of said diodes, to said positive power line.

3. The method of claim 1 wherein said process of connecting said plurality of first bypass capacitors between said positive power line and said negative power line comprises:
    connecting said plurality of first bypass capacitors between said positive power line and said negative power line sufficiently close to said series pairs of diodes to substantially eliminate effects of stray inductance in said positive power line and said negative power line.

4. The method of claim 3 wherein said process of connecting said plurality of second bypass capacitors between said input node and said negative power line comprises:
    connecting said plurality of second bypass capacitors between said input node and said negative power line at a location that is sufficiently close to said input node to substantially eliminate effects of stray capacitance on said negative power line.

5. The method of claim 4 wherein said process of connecting said plurality of second bypass capacitors between said input node and said negative power line comprises:
    connecting said plurality of second bypass capacitors between said input node and said negative power line that have a capacitance that is less than the capacitance of a human touching said power pad to prevent said power pad from automatically turning off.

6. The method of claim 5 wherein said process of connecting a predetermined number of pairs of diodes comprises connecting a predetermined number of pairs of Schottky diodes.

7. A method of protecting a rectifier circuit from electrostatic pulses that occur between a power pad and an electronic device comprising:
    connecting a predetermined number of pairs of diodes in series in the same polarity direction to produce a plurality of series pairs of diodes;
    connecting said plurality of series pairs of diodes in parallel with cathodes of one diode in each of said series pairs connected to a positive power line and anodes of the other diode in each of said series pairs connected to a negative power line;
    providing a predetermined number of contacts on said electronic device;
    connecting said predetermined number of contacts to input nodes located between said predetermined number of pairs of diodes;

connecting a plurality of first bypass capacitors between said positive power line and said negative power line, proximate to each of said series pairs of diodes, to function as a bypass for said electrostatic pulses that have a rise time that allows said diodes to conduct and prevent damage to said diodes as a result of reverse biasing;

connecting a plurality of second bypass capacitors between said input node and said positive power line, proximate to said input node, to discharge said electrostatic pulses, that have a rise time that is faster than the turn-on time of said diodes, to said positive power line.

8. The method of claim 7 wherein said process of connecting said plurality of first bypass capacitors between said positive power line and said negative power line comprises:

connecting said plurality of first bypass capacitors between said positive power line and said negative power line sufficiently close to said series pairs of diodes to substantially eliminate effects of stray inductance in said positive power line and said negative power line.

9. The method of claim 8 wherein said process of connecting said plurality of second bypass capacitors between said input node and said positive power line comprises:

connecting said plurality of second bypass capacitors between said input node and said positive power line at a location that is sufficiently close to said input node to substantially eliminate effects of stray capacitance on said positive power line.

10. The method of claim 8 wherein said process of connecting said plurality of second bypass capacitors between said input node and said positive power line comprises:

connecting said plurality of second bypass capacitors between said input node and said positive power line that have a capacitance that is less than the capacitance of a human touching said power pad to prevent said power pad from automatically turning off.

11. The method of claim 9 wherein said process of connecting a predetermined number of pairs of diodes comprises connecting a predetermined number of pairs of Schottky diodes.

12. A rectifier circuit that is protected from electrostatic pulses that are applied to an electronic device from a power pad comprising:

a plurality of pairs of diodes that are connected in series in the same polarity direction, said pairs of diodes being connected in parallel, with cathodes of one diode in each of said pairs connected to a positive power line, and anodes of the other diode in each of said pairs connected to a negative power line;

an input node located between said pairs of diodes that are connected in series;

power contacts that are connected to said input nodes;

a first bypass capacitor that is connected between said positive power line and said negative power line, proximate to each of said pairs of diodes, that functions as a bypass for said electrostatic pulses that have a rise time that allows said diodes to conduct and prevent damage to said diodes as a result of reverse biasing;

a second bypass capacitor that is connected between said input node and said negative power line, proximate to said input node, to discharge said electrostatic pulses, that have a rise time that is faster than the turn-on time of said diodes, to said negative power line.

13. The rectifier circuit of claim 12 wherein said first bypass capacitor is connected sufficiently close to each of said pairs of diodes to substantially eliminate effects of stray inductance in said positive power line and said negative power line.

14. The rectifier circuit of claim 13 wherein said second bypass capacitor is connected to said negative power line at a location that is sufficiently close to said input node to substantially eliminate effects of stray capacitance on said negative power line.

15. The rectifier circuit of claim 14 wherein said second bypass capacitor has a capacitance that is less than the capacitance of a human touching said power pad.

16. The rectifier circuit of claim 15 wherein said diodes are Schottky diodes.

17. The rectifier circuit of claim 12 further comprising:

a third bypass capacitor that is connected between said input node and said positive power line, proximate to said input node to discharge said electrostatic pulses, that have a rise time that is faster than the turn-on time of said diodes to said positive power line.

18. A rectifier circuit that is protected from electrostatic pulses and that are applied to an electronic device from a power pad comprising:

a plurality of pairs of diodes that are connected in series in the same polarity direction, said pairs of diodes being connected in parallel, with cathodes of one diode in each of said pairs connected to a positive power line, and anodes of the other diode in each of said pairs connected to a negative power line;

an input node located between said pairs of diodes that are connected in series;

power contacts that are connected to said input nodes;

a first bypass capacitor that is connected between said positive power line and said negative power line, proximate to each of said pairs of diodes, that functions as a bypass for said electrostatic pulses that have a rise time that allows said diodes to conduct and prevent damage to said diodes as a result of reverse biasing;

a second bypass capacitor that is connected between said input node and said positive power line, proximate to said input node, to discharge said electrostatic pulses, that have a rise time that is faster than the turn-on time of said diodes, to said positive power line.

19. The rectifier circuit of claim 18 wherein said diodes are Schottky diodes.

20. The rectifier circuit of claim 19 wherein said first bypass capacitor is connected sufficiently close to each of said pairs of diodes to substantially eliminate effects of stray inductance in said positive power line and said negative power line.

21. The rectifier circuit of claim 20 wherein said second bypass capacitor is connected to said positive power line at a location that is sufficiently close to said input node to substantially eliminate effects of stray capacitance on said positive power line.

22. The rectifier circuit of claim 21 wherein said second bypass capacitor has a capacitance that is less than the capacitance of a human touching said power pad.

23. A rectifier circuit disposed in an electronic device that is protected from electrostatic pulses comprising:

diode means for rectifying an input signal and applying said input signal to a positive power line and a negative power line depending upon the polarity of said input signal;

first bypass capacitor means for providing a low impedance path for high frequency signals between said positive power line and said negative power line that discharges said electrostatic pulses applied to said rectifier circuit wherever said diode means has a response time that is sufficient to conduct said electrostatic pulses;

second bypass capacitor means for providing a low impedance path between an input node of said rectifier circuit and said negative power line that discharges said electrostatic pulses that have a rise time that is faster than the turn-on time of said diode means.

24. The rectifier circuit of claim 23 further comprising:
third bypass capacitor means for providing a low impedance path between said input node of said rectifier circuit and said positive power line that discharges said electrostatic pulses that have a rise time that is faster than said turn-on time of said diode means.

25. A mechanical discharge device for discharging electrostatic pulses between a power pad and contacts on a portable electronic device comprising:
a contact disposed in an opening in a surface of said portable electronic device;
a spring that bias said contact in said opening so that a portion of said contact protrudes from said surface of said electronic device and retracts when said portable electronic device is placed on said power pad;
a discharge conductor adjacent to said contact that electrically connects said contact to ground potential, when said contact protrudes from said surface, to discharge said electrostatic pulses between said contact and said power pad, and electrically disconnects from said contact, when said connector retracts.

26. The mechanical discharge device of claim 25 further comprising:
a conductor that electrically connects said spring to a power line in said portable electronic device so that a power signal from said power pad is applied to said portable electronic device through said contact and said spring.

27. A method of protecting circuitry in a portable electronic device from electrostatic pulses comprising:
providing a contact that is disposed in an opening in a surface of said portable electronic device;
biasing said contact with a spring so that said contact protrudes through said opening and so that said contact retracts from said opening when said portable electronic device is placed on a surface;
providing a grounding conductor, adjacent to said contact, that electrically connects said contact to ground potential whenever said contact is biased by said spring to protrude through said opening;
placing said portable electronic device on a power pad so that said contact touches said power pad, while said contact is biased to protrude from said opening and connected to said ground potential, causing said electrostatic pulses to initially discharge to said ground potential from said contact through said grounding conductor;
electrically disconnecting said contact from said grounding conductor when said contact retracts.

28. The method of claim 27 further comprising:
electrically connecting said spring to a power line in said portable electronic device so that a power signal is applied to said electronic device through said contact and said spring when said contact is electrically disconnected from said grounding conductor.

29. A mechanical discharge device for discharging electrostatic pulses between a power pad and contacts on a portable electronic device comprising:
contact means disposed in an opening in a surface of said portable electronic device;
spring means for biasing said contact in said opening so that a portion of said contact protrudes from said surface of said electronic device and retracts when said portable electronic device is placed on said power pad;
discharge conductor means adjacent to said contact for electrically connecting said contact to ground potential, when said contact protrudes from said surface, to discharge said electrostatic pulses between said contact and said power pad, and electrically disconnecting from said contact, when said connector retracts, so that a power signal can be applied from said power pad through said contact to said portable electronic device.

* * * * *